United States Patent Office 2,991,248
Patented July 4, 1961

2,991,248
FOAM INHIBITED HYDROCARBON COMPOSITION
Robert William Gunn Preston and Michael Taylor, Norton-on-Tees, England, assignors to Imperial Chemical Industries Limited, London, England, a corporation of Great Britain
No Drawing. Filed Mar. 10, 1958, Ser. No. 720,094
Claims priority, application Great Britain Mar. 20, 1957
5 Claims. (Cl. 252—34)

This invention relates to hydrocarbon-containing compositions.

In general, petroleum hydrocarbons per se have little or no tendency to foam in use. It is necessary, however, for many purposes to incorporate additives, for example detergents, into the hydrocarbons, in the presence of which the hydrocarbons give rise on use to a quantity of foam, particularly if they are circulated or agitated in the presence of air or other gases in a mechanical system such as a gear box. This foam can adversely affect the efficiency of the hydrocarbon, and ultimately interfere with the smooth operation of the system in which it is being employed.

According to the present invention, hydrocarbon compositions are provided which have decreased foaming tendencies, the said compositions comprising a liquid hydrocarbon having incorporated therein at least 0.1 gram per litre of hydrocarbon of a compound having the formula:

$$RX(CHR')_nCOOY$$

in which R is alkyl, aryl, alkaryl or aralkyl; X is either oxygen or sulphur; R' is hydrogen or an alkyl group in any one or more of the CHR' groups; Y is hydrogen, a metal whose said salt is soluble in the hydrocarbon, or the ammonium radical; and $n$ is a whole number.

It will be understood that in the compound $$RX(CHR')_nCOOY$$

if there are two or more alkyl groups R', these may be the same or different.

A preferred amount of the said compound having the structure $RX(CHR')_nCOOY$ in the hydrocarbon composition is from 0.1 gram to 1 gram per litre. If necessary, however, amounts in excess of 1 gram per litre may be employed.

An advantage of the novel compositions of the present invention is that they have a considerably decreased tendency to foam, especially in circumstances where the hydrocarbon is subjected to considerable churning, for example when it is being used as a lubricant for gears.

Preferably the compound incorporated in the liquid hydrocarbons is an acetic acid derivative having a formula $RXCH_2COOY$, or a propionic acid derivative having the formula $RX(CH_2)_2COOY$, in either case R being an alkyl, aryl or alkaryl group. More particularly it is preferred to use a para-alkyl phenoxy acetic acid or a salt thereof, especially para-octyl and para-nonyl phenoxy acetic acids, which are preferably used in amounts of 0.5 to 1 gram per litre of hydrocarbon. The term "octyl" as employed in this specification is intended to cover octyl groups in general rather than any specific isomer, but the branched chain octyl group formed in the dimerisation of isobutene is particularly suitable. Similarly the term "nonyl" is used in the broad sense of any $C_9H_{19}$ grouping, but the nonyl group formed in the trimerisation of propylene is particularly suitable.

Examples of hydrocarbons to which the invention may be applied are crankcase oils, particularly for "dry sump" operation, transmission fluids, hydraulic fluids and turbine oils. The foaming tendency of such liquids may be aggravated by the presence of other additives, such as for example, long chain sulphonic acid detergents, and alkyl phosphate corrosion inhibitors.

The advantages of the invention are brought out by the following examples.

EXAMPLE 1

A light machinery oil having a viscosity of 125 centistokes at 75° F. and 15.5 centistokes at 140° F. and a density of 0.92 gm./cc. was employed. This oil contained 0.15% by weight of sodium dodecylbenzene sulphonate. It was subjected to a modified form of the Institute of Petroleum method of testing foaming, 146/55T (A.S.T.M. equivalent D892–46T). Air was passed through the oil maintained at 22° C. at a rate of 6 litres/hour using a medium porosity sintered spoon resting on the bottom of a 250 ml. measuring cylinder containing 100 ml. of the test oil. If the foaming tendency was relatively small, the volume of foam was determined at 1 minute intervals and the volume of foam at 5 minutes is quoted as the index in Table 1 below. If the volume of foam formed at 5 minutes exceeded 200 mls. then the index is the time taken to form 200 mls.

Some figures are also given for an oil containing the ammonium salt of the reaction product of nonanol (3,5,5-trimethylhexanol) and phosphorus pentoxide instead of sodium dodecylbenzenesulphonate.

Table 1

| Inhibitor | Concentration (wt./wt.), percent | Test Oil | Vol. of foam, mls. | Time, mins. |
|---|---|---|---|---|
| Nil | | Oil+0.15% sodium dodecylbenzenesulphonate. | 200 | 1 |
| para-nonylphenoxy acetic acid. | 0.01 | ----do---- | 200 | 3 |
| Do | 0.05 | ----do---- | 120 | 5 |
| Do | 0.05 | ----do---- | 110 | 5 |
| Do | 0.10 | ----do---- | Nil | 5 |
| Do | 0.10 | ----do---- | 5 | 5 |
| para-octylphenoxy acetic acid. | 0.01 | ----do---- | 200 | 2 |
| Do | 0.05 | ----do---- | 30 | 5 |
| Do | 0.10 | ----do---- | 4 | 5 |
| Nil | | Oil+0.1% ammonium nonylphosphate. | 200 | 3 |
| para-nonylphenoxy acetic acid. | 0.05 | ----do---- | 10 | 5 |

EXAMPLE 2

Example 1 was repeated using a low viscosity (S.A.E. 20 grade) oxidation-resistant, internal combustion engine oil, to which were added 0.15% by weight of sodium dodecylbenzenesulphonate and minor amounts as shown in Table 2 below of ammonium or sodium nonylphenoxy acetates.

Table 2

| Inhibitor | Concentration (wt./wt.), percent | Vol of foam (mls.) | Time |
|---|---|---|---|
| Nil | | 200 | 2 mins., 10 secs. |
| Ammonium para-nonylphenoxy acetate. | 0.05 | 50 | 5 mins. |
|  | 0.10 | 10 | 5 mins. |
| Sodium para-nonylphenoxy acetate. | 0.05 | 25 | 5 mins. |
|  | 0.10 | 10 | 5 mins. |

We claim:
1. A hydrocarbon composition having decreased foaming tendencies, the said composition consisting essentially of a liquid hydrocarbon selected from the group consisting of crankcase oils, transmission fluids, hydraulic fluids and turbine oils having incorporated therein about 0.1 to about 1 gram per liter of hydrocarbon of a compound selected from the group consisting of para-octyl phenoxy acetic acid and para-nonyl phenoxy acetic acid, the alkali metal salts thereof and the ammonium salts thereof.

2. The hydrocarbon composition of claim 1, in which said compound is para-octyl phenoxy acetic acid.

3. The hydrocarbon composition of claim 1, in which said compound is para-nonyl phenoxy acetic acid.

4. The hydrocarbon composition of claim 2, in which said para-octyl group is the branched chain one formed by the dimerization of isobutene.

5. The hydrocarbon composition of claim 3, in which the nonyl group is that formed in the trimerization of propylene.

References Cited in the file of this patent

UNITED STATES PATENTS

| | | |
|---|---|---|
| 1,920,160 | Bruson | July 25, 1933 |
| 2,044,968 | Bruson | June 23, 1936 |
| 2,110,847 | De Groote | Mar. 8, 1938 |
| 2,198,293 | Reiff et al. | Apr. 23, 1940 |
| 2,198,307 | Hope et al. | Apr. 23, 1940 |
| 2,354,550 | Rosen | July 25, 1944 |
| 2,491,066 | Wasson et al. | Dec. 13, 1949 |

FOREIGN PATENTS

| | | |
|---|---|---|
| 873,646 | France | Mar. 30, 1942 |